United States Patent [19]

Shimeki et al.

[11] Patent Number: 4,525,753
[45] Date of Patent: Jun. 25, 1985

[54] CIRCUIT ARRANGEMENT AND METHOD FOR MAGNETIC RECORDING/REPRODUCING

[75] Inventors: Yasuharu Shimeki, Suita; Misao Kato, Katano; Hiroshi Matsushima; Toshiro Ishikawa, both of Hirakata, all of Japan

[73] Assignee: Matsushita Electric Industrial Company, Limited, Kadoma, Japan

[21] Appl. No.: 498,515

[22] Filed: May 26, 1983

[30] Foreign Application Priority Data

May 27, 1982 [JP] Japan .................................. 57-90740

[51] Int. Cl.³ .............................................. G11B 5/09
[52] U.S. Cl. ........................................ 360/45; 360/46
[58] Field of Search ....................... 360/39, 40, 46, 45, 360/51

[56] References Cited

U.S. PATENT DOCUMENTS 3,016,523  1/1962  Sharp ..................................... 360/46

Primary Examiner—Vincent P. Canney
Attorney, Agent, or Firm—Cushman, Darby & Cushman

[57] ABSTRACT

In a magnetic recording/reproducing apparatus having a multi-track head for writing a digital signal on a magnetic recording medium, a plurality of head of the multi-track head is electrically divided into a plurality of groups which are respectively driven by writing currents produced in accordance with a plurality of modulated signals indicative of input digital data. The writing currents fed to the heads of the same group are produced in response to a pulse signal such that a plurality of pulse signals having different phases are used for respective groups. The head in the same group are positioned so that they are not adjacent to each other, and therefore, undesirable crosstalk can be reduced because heads corresponding to adjacent tracks are prevented from being driven simultaneously, while the entire writing current power can be reduced. The waveform of each of the writing currents may be controlled in accordance with the period of level inversion of the modulated signals, and therefore, peak shift phenomena due to waveform interference can be reduced.

14 Claims, 25 Drawing Figures

|  | | SIGNAL PERIOD | WRITING CURRENT PULSE PHASE | |
|---|---|---|---|---|
| TRACK 1 | ///////// | 2T | $\phi_2$ | |
| TRACK 2 | \\\\\\\\\ | T | $\phi_1$ | $\phi_1$ ⎍⎍⎍ |
| TRACK 3 | ///////// | 2T | $\phi_2$ | $\phi_2$ ⎍⎍⎍ |

| TRACK 1 | ///////// | 2T | $\phi_1$ |
|---|---|---|---|
| TRACK 2 | ///////// | 2T | $\phi_2$ |
| TRACK 3 | \\\\\\\\\ | T | $\phi_1$ |
| TRACK 4 | ///////// | 2T | $\phi_2$ |
| TRACK 5 | ///////// | 2T | $\phi_1$ |

|  | | SIGNAL PERIOD | WRITING CURRENT PULSE PHASE |
|---|---|---|---|
| TRACK 1 | ////////// | 2T | $\phi_1$ |
| TRACK 2 | ////////// | 2T | $\phi_2$ |
| TRACK 3 | ////////// | 2T | $\phi_3$ |
| TRACK 4 | \\\\\\\\\\ | T | $\phi_1$ |
| TRACK 5 | ////////// | 2T | $\phi_2$ |
| TRACK 6 | ////////// | 2T | $\phi_3$ |
| TRACK 7 | ////////// | 2T | $\phi_1$ |

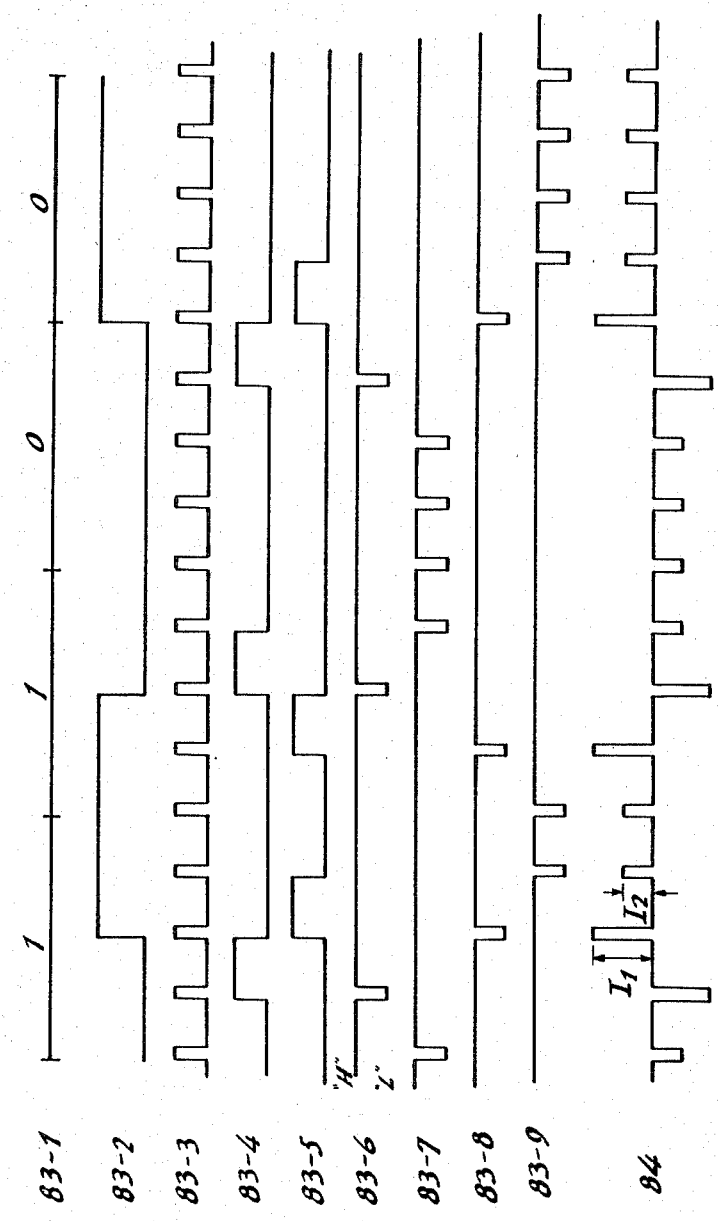

CIRCUIT ARRANGEMENT AND METHOD FOR MAGNETIC RECORDING/REPRODUCING

BACKGROUND OF THE INVENTION

This invention relates generally to magnetic recording apparatus for recording and reproducing digital data by means of a multi-track head on and from a magnetic recording medium such as a magnetic tape, disc, drum or the like. Particularly, the present invention relates to a circuit arrangement and a method for controlling the operating state of each head in the multi-track head so as to reduce crosstalk between adjacent tracks.

Conventionally, when digital data is recorded on a magnetic recording medium, a magnetic head has been driven by a writing or recording signal having the same waveform as that of the digital signal. Recently a high-density magnetic multi-track head has been actualized by so called thin film magnetic head, and therefore it is now possible to record digial data at a high density on a magnetic recording meidum. However, since such a thin film magnetic head comprises less number of coil turns when compared with a conventional bulk head, it is necessary to drive a thin film magnetic head with a relatively large amount of recording current. Due to such large amount of recording current applied to a thin film magnetic head, and also due to high density such a high-density thin film head is apt to suffer from crosstalk between adjacent or close tracks.

Furthermore, such a high-density thin film multi-track head also suffers from a problem of peak shift, which is a phenomenon that the position of a peak of a reproducing signal, indicative of logic "1" or "0", is undesirably shifted from a position of high magnetic flux inversion density toward a position of low magnetic flux inversion density. Although various circuit arrangements have been devised hitherto for compensating for such peak shift, all the conventional arrangements suffer from complex circuit arrangement.

SUMMARY OF THE INVENTION

The present invention has been developed in order to remove the above-described drawbacks inherent to the conventional circuit arrangments for recording/reproducing via a high density multi-track magnetic head on a magnetic recording medium.

It is, therefore, an object of the present invention to provide a new and useful circuit arrangement of simple structure, which reduces crosstalk between adjacent tracks, and also reduces the capacity of power source required for effecting recording by using a multi-track head.

Another object of the present invention is to provide such a circuit arrangement with which undesirable peak shift is effectively prevented or suppressed.

In order to achieve the above objects, the circuit arrangement according to the present invention comprises a plurality of modulators, which are used to modify digital data to be recorded or a plurality of tracks, a plurality of writing circuits, which convert modulated digital signals from the modulators into a plurality of writing currents or signals by controlling the number of pulses forming each writing current, or by controlling the peak value of such pulses in accordance with the period of level inversion of respective modulated signals, and a pulse generator for generating pulse trains of different phases. The plurality of heads is electrically divided into a plurality of groups so that the writing signals respectively fed to heads of the same group are produced by corresponding writing circuits by using a pulse signal having the same phase. Namely, writing signals fed to heads of different groups are produced by remaining pulse trains having a different phase or phases so that the writing signals for different group heads do not coincide with each other.

In accordance with the present invention there is provided a circuit arrangement for use with a magnetic recording apparatus for writing digital data on a plurality of tracks on a magnetic recording medium by means of a multi-track head, comprising: a plurality of modulators each responsive to a signal to be recorded on a single track for producing a modulated signal; a pulse generator for producing M pulse trains having different phases from another so that pulses of the M pulse trains do not coincide, wherein M is a positive integer other than one; and a plurality of writing circuits each responsive to each of the modulated signals from the modulators and to each of the pulse trains from the pulse generator, the writing circuits producing respectively writing currents fed to heads of the multi-track head, the writing currents being fed to the heads such that writing currents having the same phase are fed to a plurality of the heads belonging to the same group where said heads of said multi-track head are electrically divided, the heads of the same group being positioned so that they are not adjacent to each other.

In accordance with the present invention there is also provided a method of magnetically recording digital data on a magnetic recording medium by means of a multi-track head, comprising the steps of: modulating the digital data to provide a plurality of modulated signals; producing M pulse trains having different phases from another so that pulses of the M pulses do not coincide, wherein M is a positive integer other than one; and producing a plurality of writing currents for driving a plurality of heads of the multi-track head to write the modulated signals on the recording medium by forming a plurality of tracks thereon, each of the writing currents being produced by using each of the modulated signals and each of the pulse trains, the writing currents being fed to the heads such that writing currents having the same phase are fed to a plurality of the heads belonging to the same group where said heads of said multi-track head are electrically divided into M groups, the heads of the same group being positioned so that they are not adjacent to each other.

BRIEF DESCRIPTION OF THE DRAWINGS

The object and features of the present invention will become more readily apparent from the following detailed description of the preferred embodiments taken in conjunction with the accompanying drawings in which:

FIGS. 13, consisting of FIGS. 13A and 13B, and 14 are diagrams showing the result of experiments useful for understanding the advantage provided by the present invention;

FIG. 24 is a waveform chart showing the operation of the writing circuit used for the fifth embodiment.

The same or corresponding elements and parts are designated at like reference numerals throughout the drawings.

DETAILED DESCRIPTION OF THE INVENTION

Prior to describing preferred embodiments of the present invention, the above-mentioned conventional techniques will be further described with reference to FIGS. 1 through 4 for a better understanding of the present invention.

FIGS. 1–4 are waveform charts showing some conventional ways for compensating for or correcting the above-mentioned peak shift, and all these examples are of modified frequency modulation (MFM). Precorrected signal waveform is shown by way of a dot-dash line in these diagrams, while corrected signal waveform is shown by way of a solid line. In the case of no correction, peak shift occurs such that the signal waveform is shifted or forcibly moved from a high-density (or high-frequency) magnetic flux inversion portion to a low-density (or low-frequency) magnetic flux inversion portion. In other words, peak shift occurs such that inverting point or timing is shifted along time axis in a direction from a narrow pulse (short inversion period) portion toward a wide pulse (long inversion period) portion.

Figure 1:
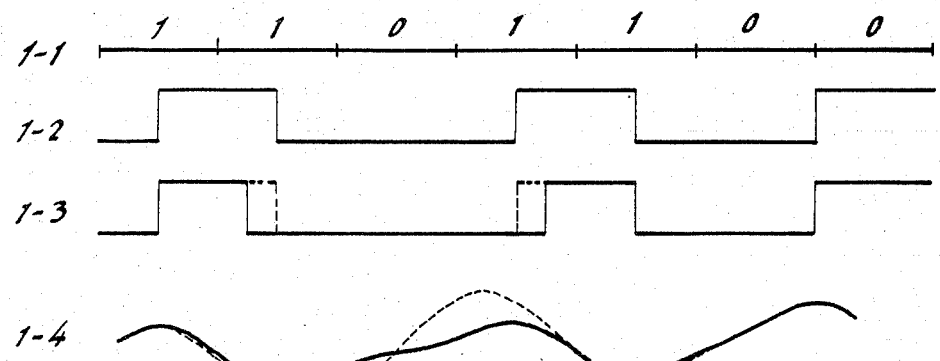
FIGS. 1 to 4 are explanatory waveform charts useful for understanding conventional ways for suppressing peak shift in a magnetic recording apparatus.

In a method of correction of FIG. 1, which is called recording timing correction, input data 1-1 is modified-frequency-modulated as a waveform 1-2, and this modulated signal is processed such that a writing current is shifted in advance so that an inverting point between long inverting period (negative going pulse having wider width) and a short inverting period (positive going pulse having narrower width) is shifted in a direction opposite to the direction in which peak shift occurs.

Figure 2:
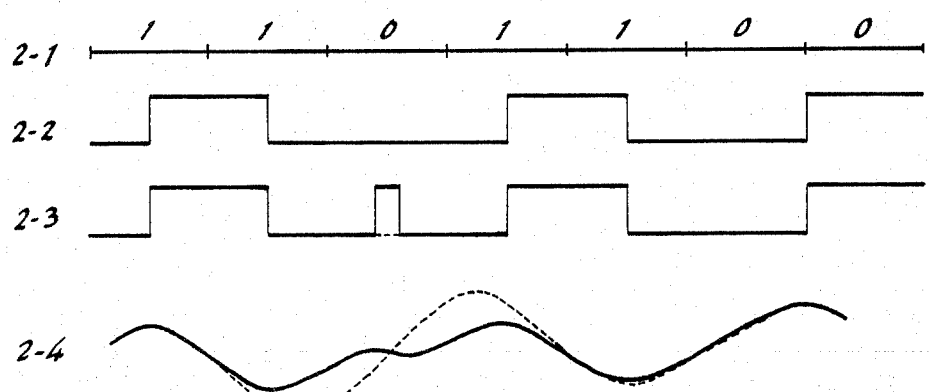

In another method of correction of FIG. 2, which is called Burroughs correction, input data 2-1 is modified-frequency-modulated as a waveform 2-2, and this modulated signal is processed such that two level-inverted portions are provided at the middle of a long inverting period for a writing signal as shown by a waveform 2-3.

Figure 3:
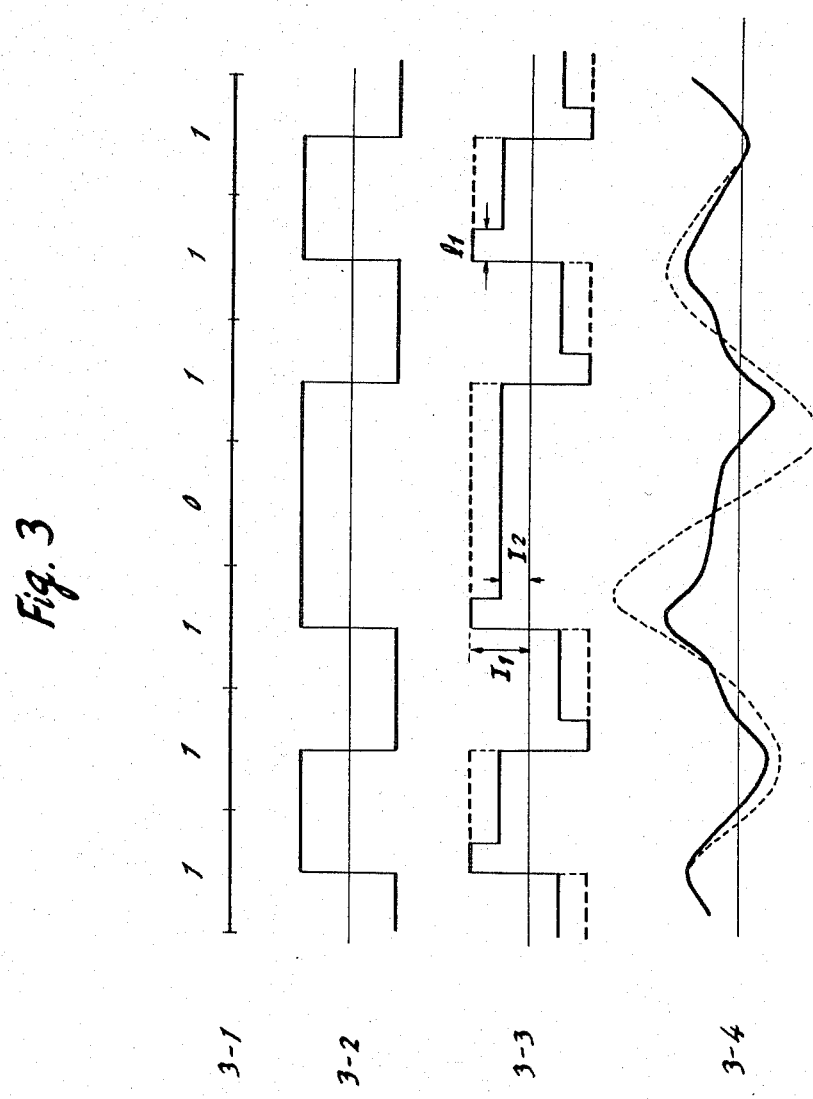

In a further method of correction shown in FIG. 3, which is called IBM correction, input data 3-1 is modified-frequency-modulated as a waveform 3-2, and this modulated signal is processed such that an additional inversion is provided after an inversion of a writing current as shown by the waveform 3-3.

Figure 4:
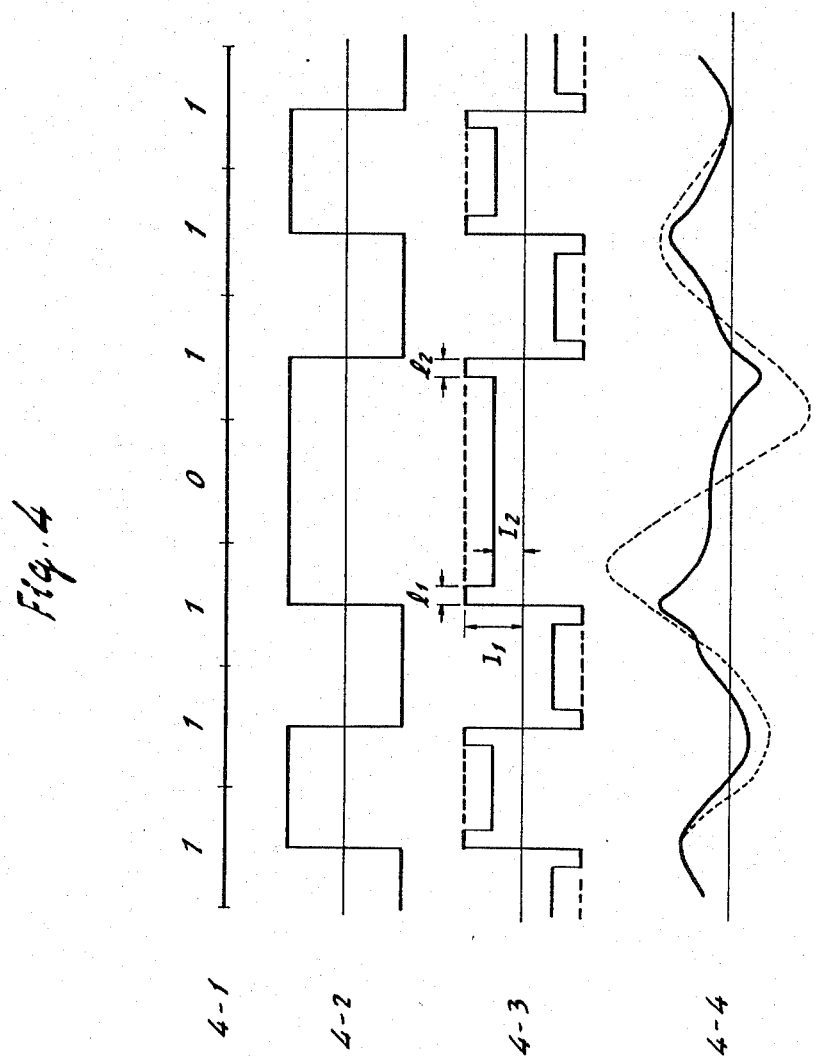

In a further method of correction shown in FIG. 4, which is called E-type correction, input data 4-1 is modified-frequency-modulated as a waveform 4-2, and this modulated signal is processed such that an additional inversion is provided before and after an inversion of a writing current as shown by the waveform 4-3.

When the above conventional methods are used, output reproduced signals 1-4, 2-4, 3-4 and 4-4 are respectively obtained on playback mode where peak shift has been suppressed. However, when a thin film multi-track magnetic head is employed, the writing current is required to have a relatively large amplitude as described in the above. Such an increase in writing current with the above-described waveform results in large power consumption by the internal resistance of the head, and thermal breakdown due to temperature increase will result.

In order to prevent such undesirable thermal breakdown, the following techniques have hitherto been employed with respect to an MFM signal for instance.

Figure 5:
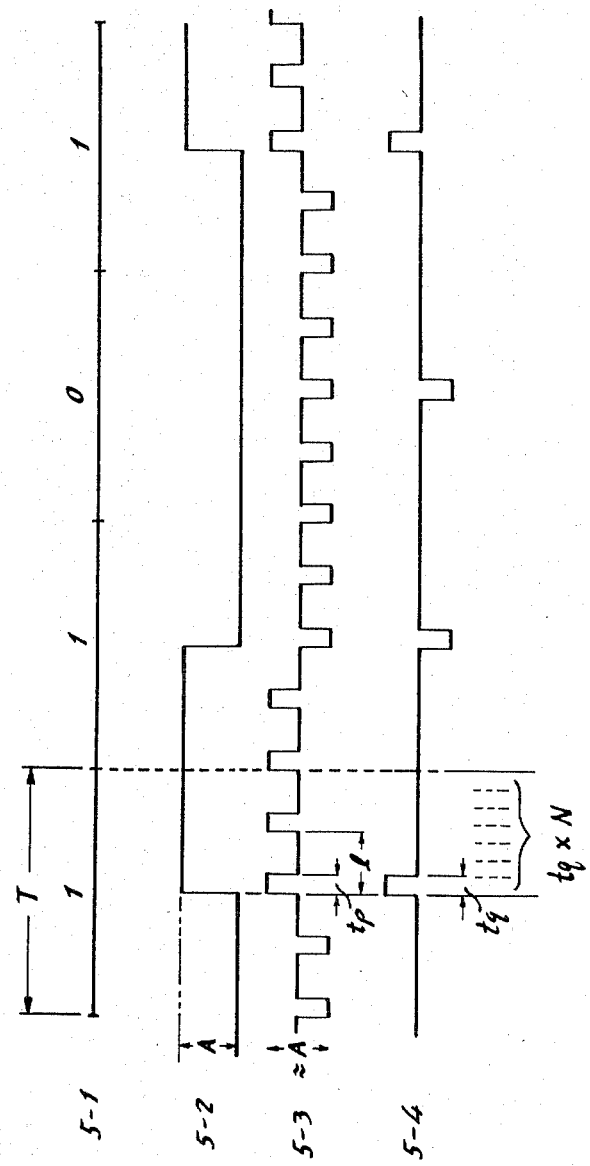
FIG. 5 is an explanatory waveform chart showing writing operation with a thin film magnetic head.

FIG. 5 shows a way of data writing by means of a thin film head. The reference 5-1 is digital data, and 5-2, the waveform of an MFM signal obtained by modulating the data 5-1. With the conventional recording method however, the recording or writing current waveform is the same as the modulated signal waveform 5-2, and since the amplitude of the recording current applied to a thin film magnetic head is required to be large enough, the electrical power consumed by the head is relatively large, resulting in heat generation. Therefore, the head is driven by a recording current 5-3 or 5-4 so as to record data 5-1 on a recording medium. The signal waveform 5-3 is called a pulse train recording current waveform which based on the fact that less electrical power is requried as the pulse width tp is narrow with respect to pulse repetition period t. As a result, heat generation by a magnetic head is lowered. Similar result will be obtained with the other recording current waveform 5-4 since the pulse width tq is narrow.

When the above-mentioned recording current is used to drive a magnetic head, although the generation of heat can be decreased, in the case of a multi-track head, the total amount of plurality of recording currents is large because recording currents are simultaneously fed to the plurality of heads. Furthermore, when a plurality of heads of a multi-track head are driven simultaneously, there arises a problem of crosstalk between adjacent or close tracks.

A technique for preventing such simultaneous energization of multi-track head has been proposed as disclosed for instance, in Japanese Utility model application 52-12308 and Japanese Patent Publication 57-12407. According to this technique, each head of a multi-track head is driven by the recording current 5-4 whose phase is shifted as much as a pulse width from another recording current. The pulse width tq in this case is given by tq=Tw/N wherein Tw is a window width used for recognizing data on demodulation, and N is the track number. In the case of MFM signal shown in FIG. 5, Tw=0.5T. According to this technique since each recording current flows via each track head at different timing from another, the occurrence of undesirable crosstalk can also be effectively prevented.

However, this technique encounters a problem that the pulse width tq becomes too narrow when the number of tracks, namely N, increases. When the pulse width tq is extremely narrow, there is a fear that recording corresponding to the waveform of the modulated signal cannot be accurately effected. For this reason, the number of tracks is limited, and sometimes crosstalk occurs when the modulated signal is corrected so that some pulses are simultaneously fed to adjacent track heads. Therefore, this technique is not suitable for high-density recording. Furthermore, when each recording signal has different phase from another, it is necessary to provide a plurality of different timing signals the number of which equals the number of tracks. This results in complex structure of the circuit arrangement.

Figure 6:
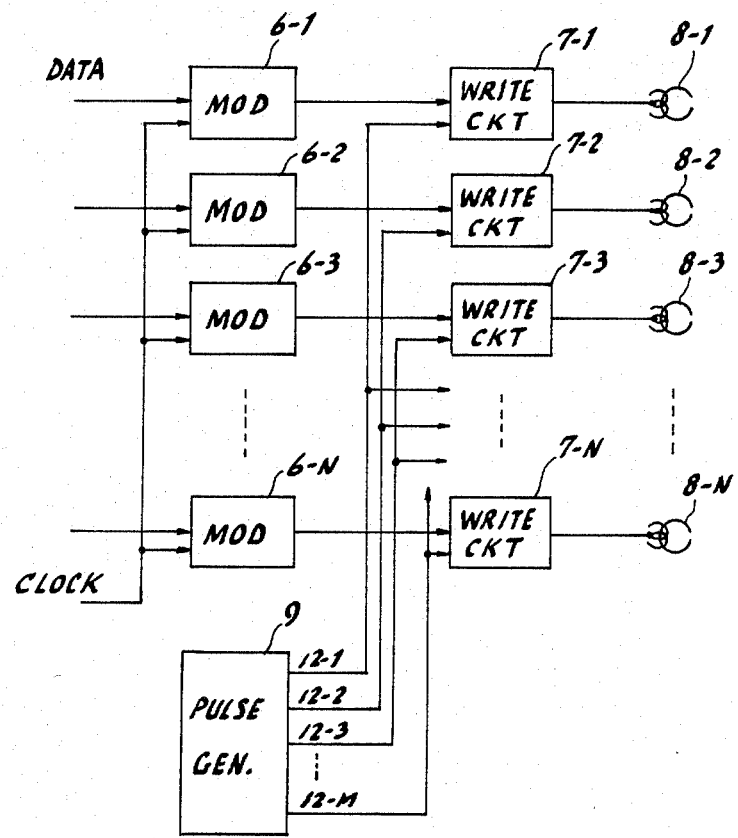
FIG. 6 is a schematic block diagram of a first embodiment of a magnetic recording system according to the present invention.
Figure 7:
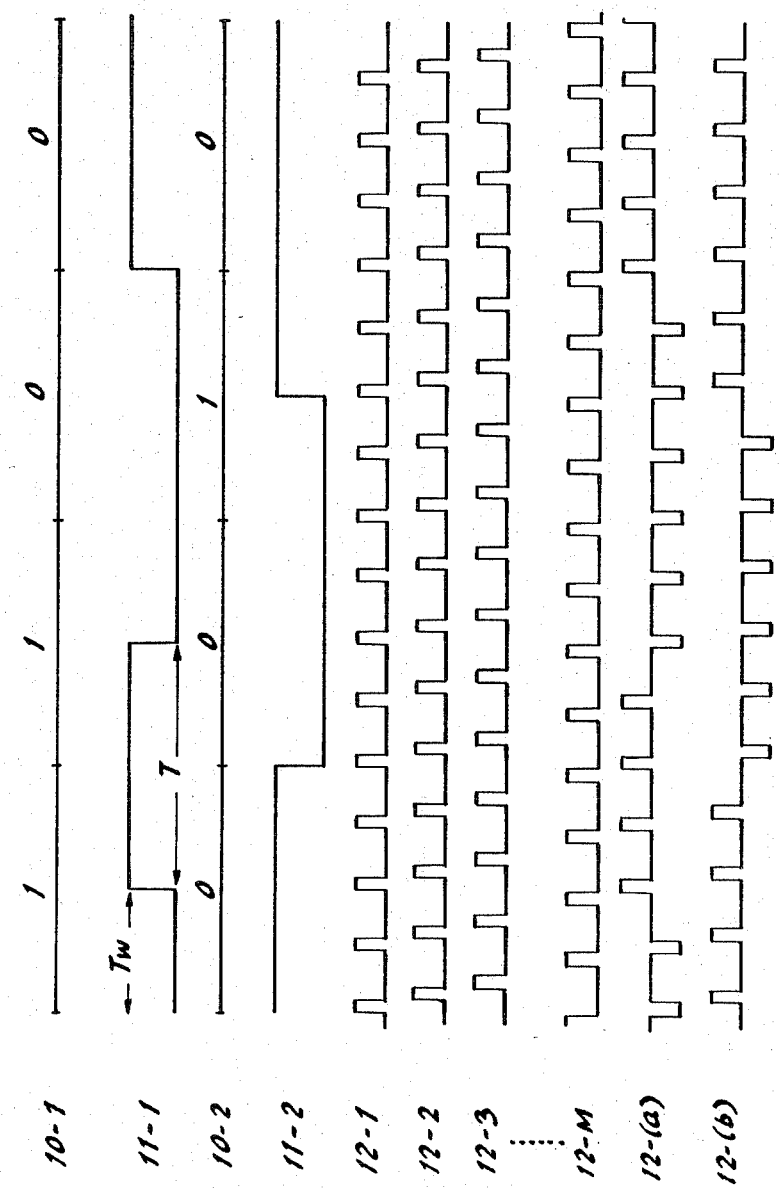
FIG. 7 is a waveform chart showing the operation of the system of FIG. 6.

A first embodiment of the present invention will be described with reference to FIG. 6 which is a block diagram of a magnetic recording system according to the present invention, and with reference to FIG. 7 which is a waveform chart showing various signal waveforms.

First of all, a plurality (the number of which is expressed in terms of N) of heads 8-1 to 8-N of a multi-track head is electrically divided into M groups wherein M and N are positive integers and M<N. The division into M groups is effected such that heads included in the same group are not located adjacent to each other. Namely, the heads of respective groups are divided into M groups which are expressed by 8-[M(i−1)+1], 8-[M(i−1)+2], 8-[M(i−1)+3], . . . 8-[M(i−1)+M] wherein i is a positive integer. Input data, which will be recorded or written by the N heads 8-1 to 8-N, are converted into modulated signals sutable for recording the same on a magnetic recording medium by means of respective modulators 6-1 to 6-N. MFM is used in this embodiment as the data modulation, and therefore when data 10-1 and 10-2 of FIG. 7 are inputted, corresponding modulated signals are such as shown in waveforms 11-1 and 11-2.

In the prior art technique, these modulated signals are amplified and are fed to respective heads. However, as described in the above the conventional circuit arrangement has suffered from heat generation and crosstalk. In the present invention, the modulated signals are converted into different pulse trains each having different phase by corresponding writing circuits 7-1 to 7-N so as to remove such problems.

A pulse generator 9 is provided to generate M pulse trains 12-1, 12-2, 12-3 . . . 12-M each having different phase from another. The repetition period of each pulse train is selected by dividing a data window width Tw on demodulation by an integer. In the example of FIG. 7, the repetition period of the pulse train is set to Tw/2. The width tp of each pulse train is selected so that M pulse trains of different pulse trains do not coincide with each other. Namely, the pulse width tp is selected so as to satisfy a condition of tp×M≦Tw/2. These pulse trains generated by the pulse generator 9 are respectively fed to writing circuits 7-1 to 7-N which may also be generally expressed by 7-[M(i−1)+1], 7-[M(i−1)+2], 7-[M(i−1)+3], . . . 7-M(i−1)+M] by using a variable i. For instance, when M=3, the pulse train 12-1 is fed to the writing circuits 7-1, 7-4, . . . , while another pulse train 12-2 is fed to the writing circuits 7-2, 7-5, . . . . Each of the writing circuits 7-1 to 7-N produced a writing current which will be fed to a corresponding magnetic head 8-1 to 8-N, by processing the modulated signal and the pulse train signal both fed thereto. For instance, when the input data 10-1 of FIG. 7 is applied to the modulator 6-1 of FIG. 6, a modulated signal 11-1 is produced as its output, and this modulated signal 11-1 is fed to the writing circuit 7-1. On the other hand, the writing circuit 11-1 is also responsive to the pulse train 12-1 from the pulse generator 9, and therefore a writing signal 12-(a) is produced at the output of the writing circuit 7-1 so that the head 8-1 is driven by this writing or recording signal 12-(a).

Another magnetic head 8-2, which is adjacent to the head 8-1, receives another writing current 12-(b) from the writing circuit 7-2. The writing circuit 7-2 is responsive to a modulated signal 11-2 corresponding to input data 10-2, and also responsive to the pulse train 12-2 which has a different phase from that of the pulse train 12-1 because the head 8-2 belongs to a group different from that of the head 8-1.

Figure 8:
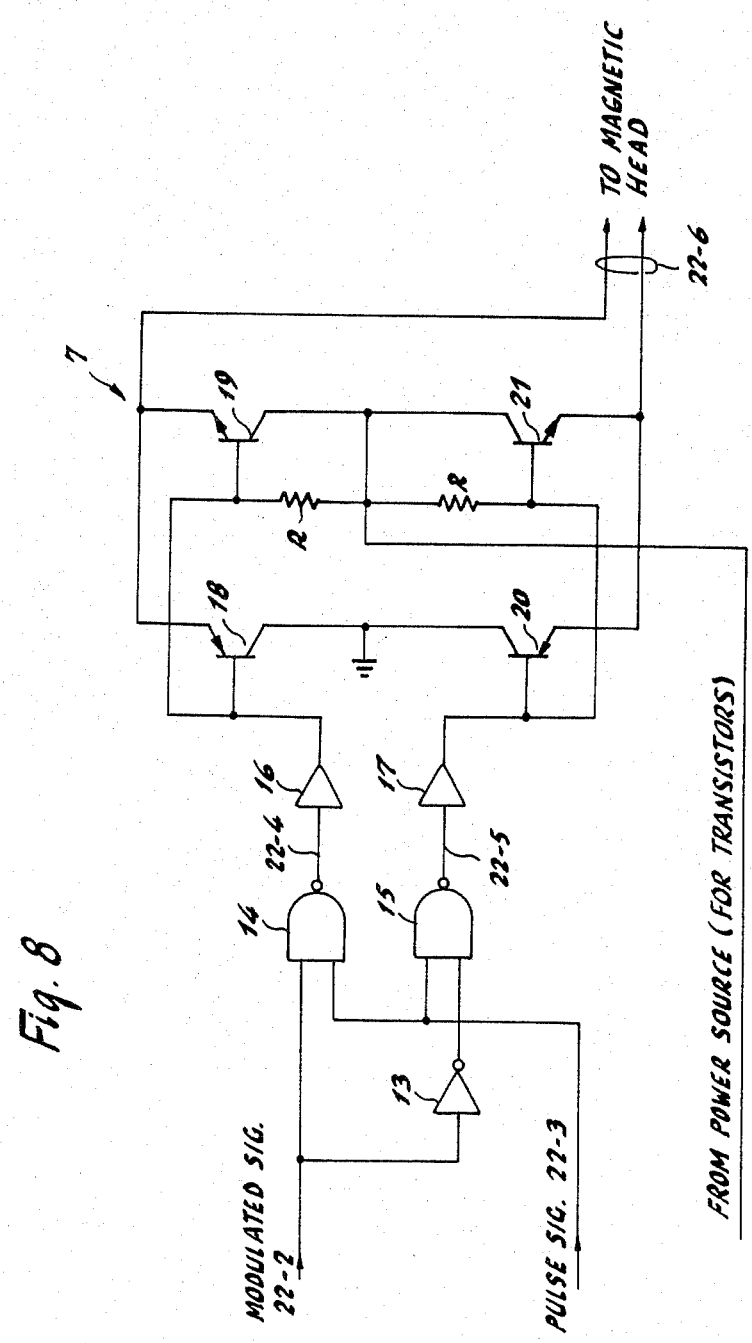
FIG. 8 is a circuit diagram of the writing circuit shown in FIG. 6.
Figure 9:
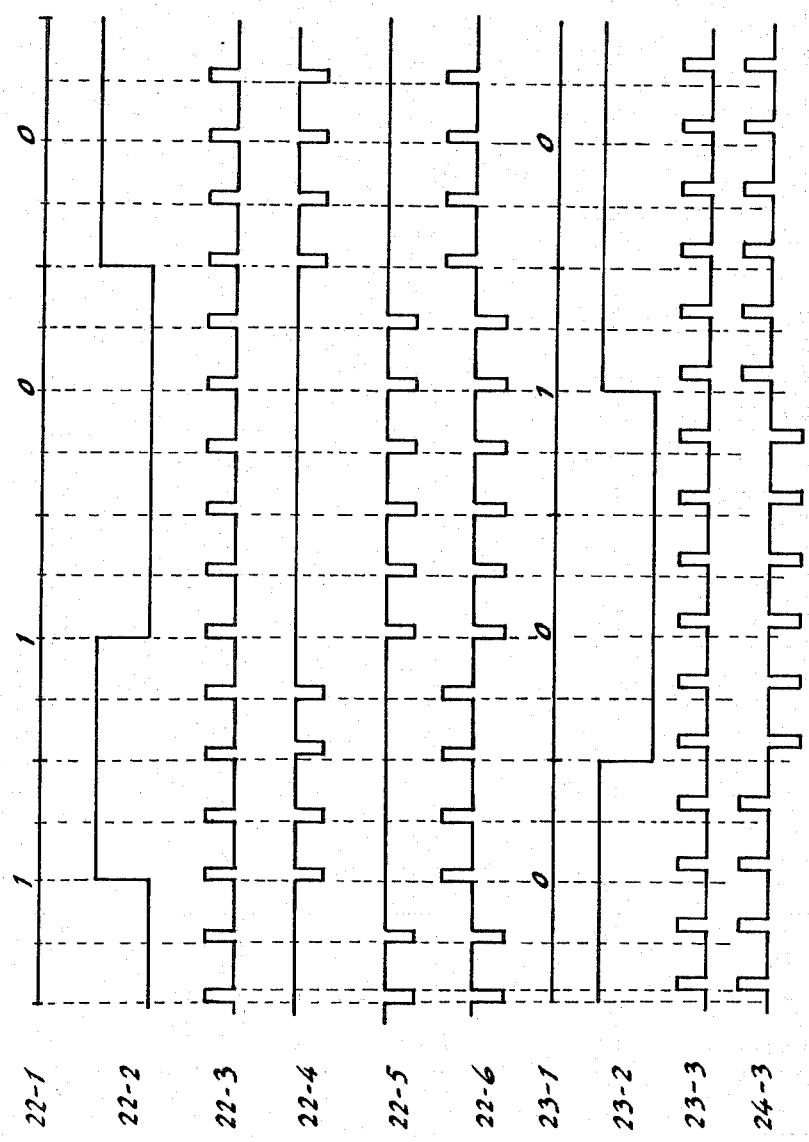
FIG. 9 is a waveform chart showing the operation of the writing circuit of FIG. 8.

FIG. 8 shows a circuit diagram of one of the writing circuits 7-1 to 7-M of FIG. 6, and its operation will be described with reference to a waveform chart of FIG. 9. The writing circuit, which is generally designated at the reference 7, comprises an inverter 13, NAND gates 14 and 15, non-inverters 16 and 17 of open-collector type, driving transistors 18 to 21 which produce a driving current. Since an MFM signal is to be applied to the writing circuit 7, the waveform of the input modulated signal corresponding to an input data signal 22-1 of FIG. 9 will be such that shown by the waveform 22-2. It is assumed that a pulse signal 22-3 is fed to the writing circuit 7 of FIG. 8 as the above-mentioned pulse train.

The modulated signal 22-2 is directly applied to an input of the NAND gate 14, and is also fed via the inverter 13 to an input of the other NAND gate 15. The other input of each of the NAND gates 14 and 15 receives the pulse signal 22-3. The waveforms of the output signals from the NAND gates 14 and 15 are shown by 22-4 and 22-5. These output signals are respectively fed via non-inverter buffers 16 and 17 to transistors 18, 19, 20 and 21 for driving them. As a result, a writing current 22-6 in the form of a pulse train is obtained to be fed to the head 8-1. Another modulated signal 23-2 corresponding to input data 23-1 is fed to another head 8-2 adjacent to the head 8-1. Since this head 8-2 belongs to a group different from that of the head 8-1, a pulse train writing signal 24-3 fed to the head 8-2 is produced by means of another writing circuit 7-2, which has the same structure as that of the writing circuit 7-1, by using a pulse signal 23-3 having different phase from that of the pulse signal 22-3. With the circuit arrangement illustrated in FIG. 8, it is possible to adjust the peak value of the pulse current waveform to a most suitable value in accordance with the characteristic of a recording head and a recording medium since the transistors 18 to 21 are supplied with electrical power from a power source which is separately provided from that used for the logic gates.

With this arrangement, M−1 heads which are located at both sides of a given head do not receive a writing current simultaneously, and therefore, the total writing current can be reduced to 1/M when compared with the case that all the heads are simultaneously driven. Since heads of adjacent tracks do not simultaneously operate, crosstalk occurs only between tracks which are spaced apart by M−1 heads. As is well known, since the influence of crosstalk reduces as the space between heads increases, the degree of crosstalk resulted from the multi-track head can be effectively decreased. Furthermore, since the phase of respective writing currents is made different from another with different pulse signals being produced, without shifting the phase of respective tracks, there is no need to provide delay circuits, which are used for providing different timings for respective heads.

Figure 10:
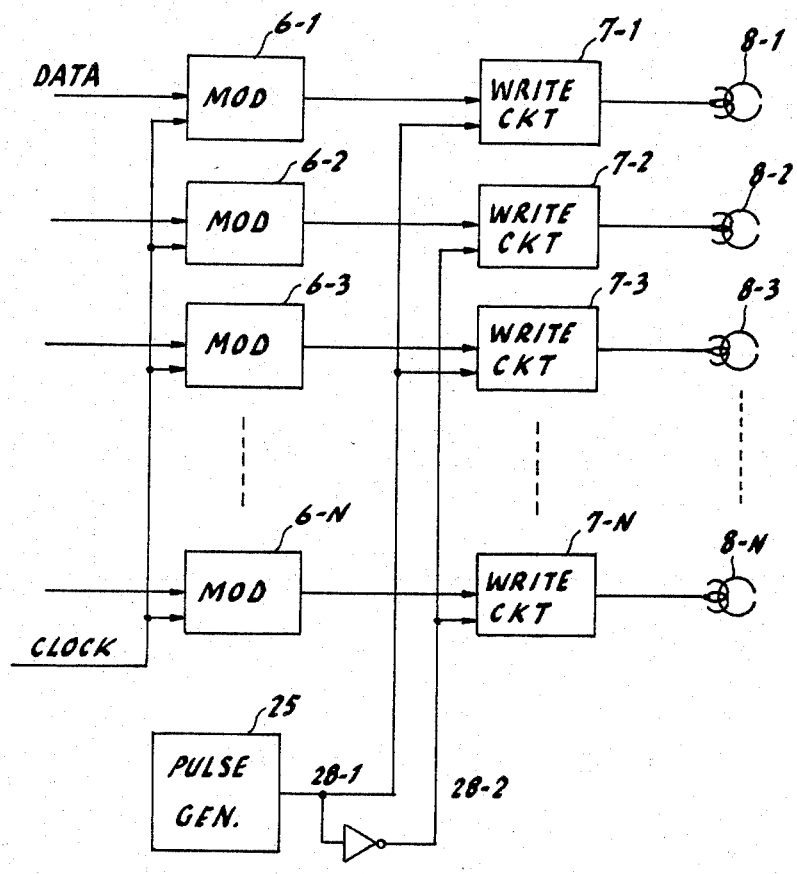
FIG. 10 is a schematic block diagram of a second embodiment of a magnetic recording system according to the present invention.
Figure 11:
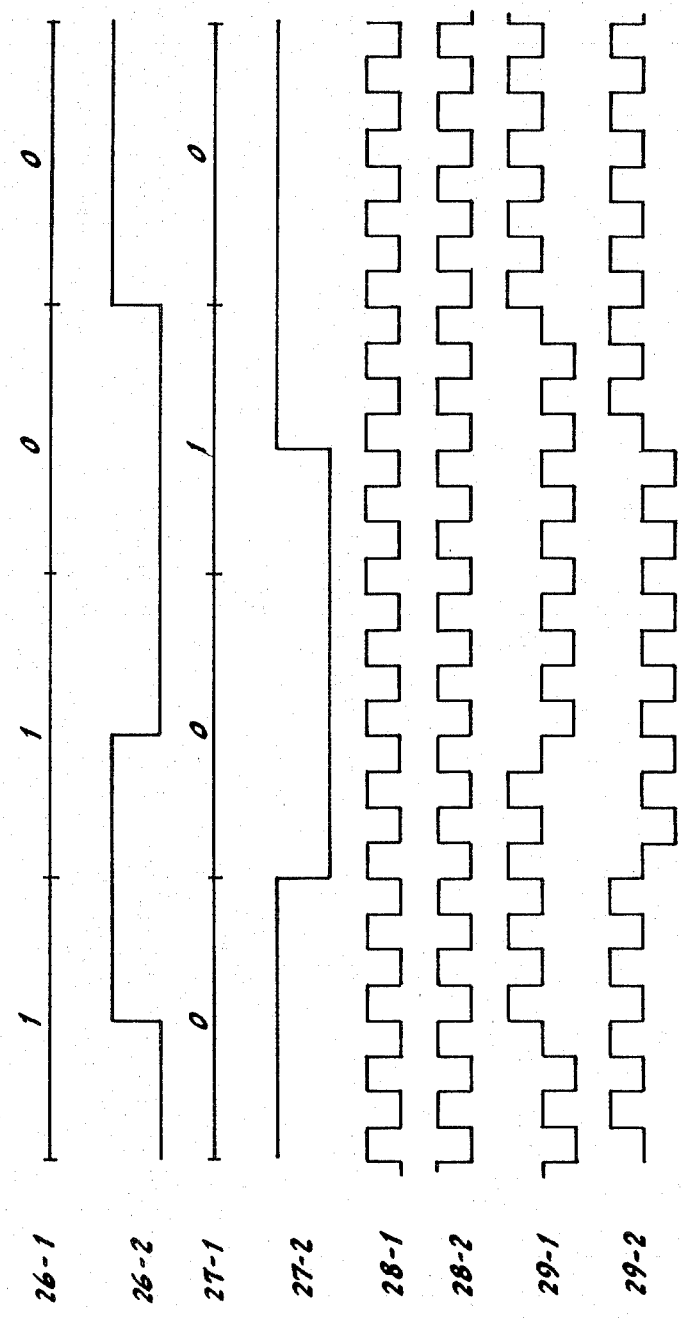
FIG. 11 is a waveform chart showing the operation of the system of FIG. 10.

Now, a recording system in a practical second embodiment will be described with reference to FIG. 10 and FIG. 11. N heads 8-1 to 8-N are divided into two groups, one being an odd number group while the other being an even number group. Data, such as 26-1, 27-1, corresponding to respective heads is modulated by the modulators 6-1 . . . 6-N (see 26-2 and 27-2), and modulated signals are respectively fed to writing circuits 7-1 . . . 7-N in the same manner as described in the above. This embodiment also uses MFM signals. A pulse signal for producing pulse train writing signls are generated in a pulse generator 25. This pulse generator 25 is arranged to generate a pulse signal 28-1 whose period is one half the data window width Tw, namely Tw/2, and the duty cycle is 50 percent. The pulse signal 28-1 is directly fed to writing circuits 7-1, 7-3 . . . 7-(N−1) corresponding to heads of odd numbers. On the other hand the pulse signal 28-1 is inverted by an inverter (no numeral) to produce an inverted pulse signal 28-2 which is fed to writing circuits 7-2, 7-4 . . . 7-N corresponding to heads of even numbers. As a result, the head 8-1 receives a writing current 29-1 from the writing circuit 7-1, while another head 8-2 adjacent to the head 8-1 receives another writing current 29-2 from the writing circuit 7-2 at the time that no current is fed to adjacent heads 8-1 and 8-3. In all embodiments, each of recording tracks obtained as recording is effected by means of the heads 8-1 . . . 8-N has a known frame structure except for a control track, as shown in FIG. 12.

Now some results of experiments will be described for showing that the present invention is useful for reducing undesirable crosstalk between adjacent tracks. As shown in FIG. 13A two different modulated signals are used to be recorded on adjacent three tracks. Namely, a first modulated signal is written on a track 1 and a track 3, and a second modulated signal on a track 2, which is interposed between the tracks 1 and 3. As the first modulated signal is used one having a period 2T, while one having a period T is used as the second modulated signal. The first modulated signal is recorded with a pulse phase $\phi 2$, while the second modualted signal is recorded with another pulse phase $\phi 1$. After recording, signals recorded on the track 2 is picked up and the amplitude of the first modulated signal component having a period 2T is detected as a crosstalk or noise level. According to the experiments, the crosstalk level of the modulated signal having a period 2T is below −40 dB. On the other hand, when all the pulse phases are uniformed to be $\phi 1$, the crosstalk level or the amplitude of the first modulated signal having a period 2T is −19 dB. From the comparison between the above two results, it is understood that improvement which is greater than at least 21 dB, is resulted.

Figures 12, 13A, 13B:
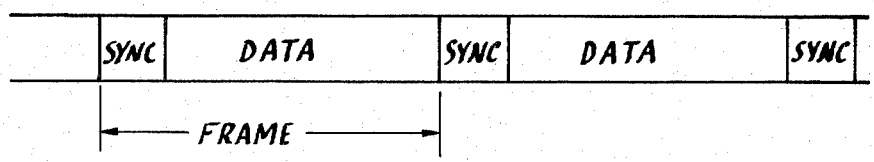
FIG. 12 is a diagram showing the structure of digital data recording signal used in the present invention.

FIG. 13B shows additional experiments. According to the experiments the above-mentioned first modulated signal having a period 2T is recorded on tracks 1, 2, 4 and 5, while the second modulated signal having a period T is recorded on track 3. The pulse phase for the tracks 1,$\phi 3$ and 5 is $\phi 1$, while the pulse phase for the tracks 2, 4 and 6 is 2. Under this condition crosstalk occurs from tracks 1 and 5 to track 3 where the crosstalk level is −38 dB. In the case that all the pulse phases are set to $\phi 1$, the crosstalk level is −17 dB. This means that improvement equals 21 dB.

Figure 14:
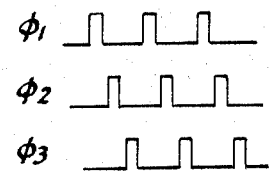

According to additional experiments in connection with the first embodiment, the crosstalk level is below −44 dB when the experiments were made under the following condition. FIG. 14 shows the experiments, wherein M=3. The first modulated signal having a period 2T is recorded on tracks 1, 2, 3, 5, 6, and 7, and the second modulated signal having a period T is recorded on track 4, where the pulse phase for tracks 1, 4 and 7 is $\phi 1$; for tracks 2 and 5, $\phi 2$; and for tracks 3 and 5, $\phi 3$. When recording is effected as the above, crosstalk occurs on track 4 from tracks 1 and 7. The above-mentioned crosstalk level is the result of measurement with respect to track 4.

Generally speaking, a value of crosstalk level, which is desired on digital signal recording and reproduction, is below −30 dB. As described in the above, since the crosstalk level according to the second embodiment of the present invention is −38 dB, this value is adequate for digital recording and reproduction. Summarizing the above-described various experiments, when two different pulse phases are used to produce writing or recording currents, crosstalk level is bettered by 21 dB when compared with a case in which only one pulse phase is used for all the writing signals. Furthermore, when three different pulse phases are used, crosstalk level is further improved by 6 dB. In this view point, although the first embodiment is superior than the second embodiment in connection with the improvement in crosstalk level, the amount or degree of improvement attained by the second embodiment is still adequate for digital recording and reproduction. Moreover, the second embodiment circuit arrangement is simple because one pulse phase is inverted to provide two different pulse phases with a single pulse generator being provided. In addition there is no need to provide delay circuits for providing various timings.

Figure 15:
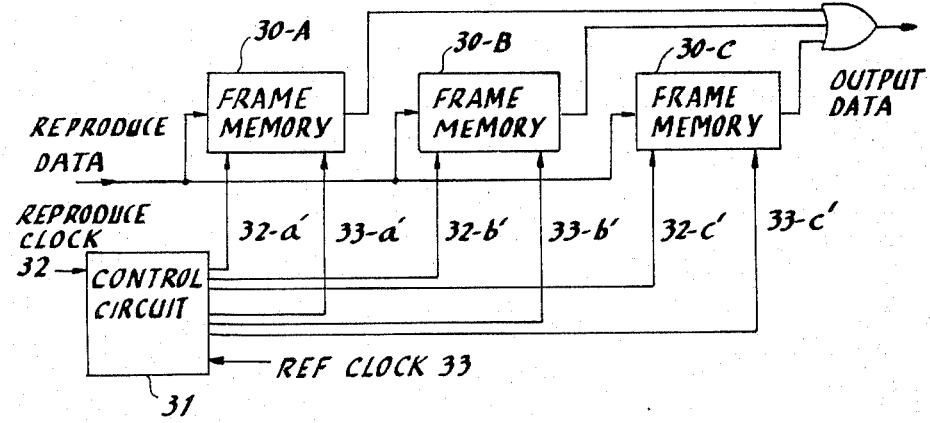
FIG. 15 is a schematic block diagram of a frame memory circuitry used for matching the phase of reproduced data trains in a reproducing system suitable for reproducing from a magnetic recording medium on which digital data have been written according to the present invention.

FIG. 15 shows a schematic block diagram of a reproducing system of the magnetic recording/reproducing apparatus according to the present invention. Reproduce or playback signals from reproduce heads are converted into digital modulation signals by way of amplifiers and waveform shaping circuits so as to obtain reproduce data and reproduce clock by means of a demodulator. The reproduce data and reproduce clock are fed to memory circuitry for absorbing jitter and adjusting timing. A circuit arrangement shown in FIG. 15 is an example of a memory used for adjusting or aligning timing.

The memory circuitry of FIG. 15 is known as a circuit arrangement for absorbing or compensating for jitter, and is provided for each reproduce signal derived from each track. The circuit arrangement comprises a control circuit 31 and three frame memories 30-A, 30-B and 30-C. The control circuit 31 is responsive to the reproduce clock and a reference clock for producing three different writing clocks 32-a', 32-b' and 32-c' and three different reading out clocks 33-a', 33-b' and 33-c'. The writing clocks 32-a', 32-b' and 32-c' are respectively produced when timing signals 30-a, 30-b and 30-c are of high level (see FIG. 16) by using the reproduce clock 32 having jitter. Each frame memory 30-A, 30-B and 30-C is driven by the writing clock 32-a', 32-b' and 32-c' so as to write the reproduce data. The reference clock 33 is produced by using a crystal resonator so that no jitter is included therein. When timing signals 33-a, 33-b and 33-c are of high level, reading out clocks 33-a', 33-b' and 33-c' are respectively produced by using the reference clock 33 in the control circuit 31, and these reading out clocks 33-a', 33-b' and 33-c' are respectively fed to the frame memories 30-A, 30-B and 30-C so as to read out reproduce data stored therein. As a result, reproduce data can be obtained with jitter being absorbed or compensated for.

Figure 16:
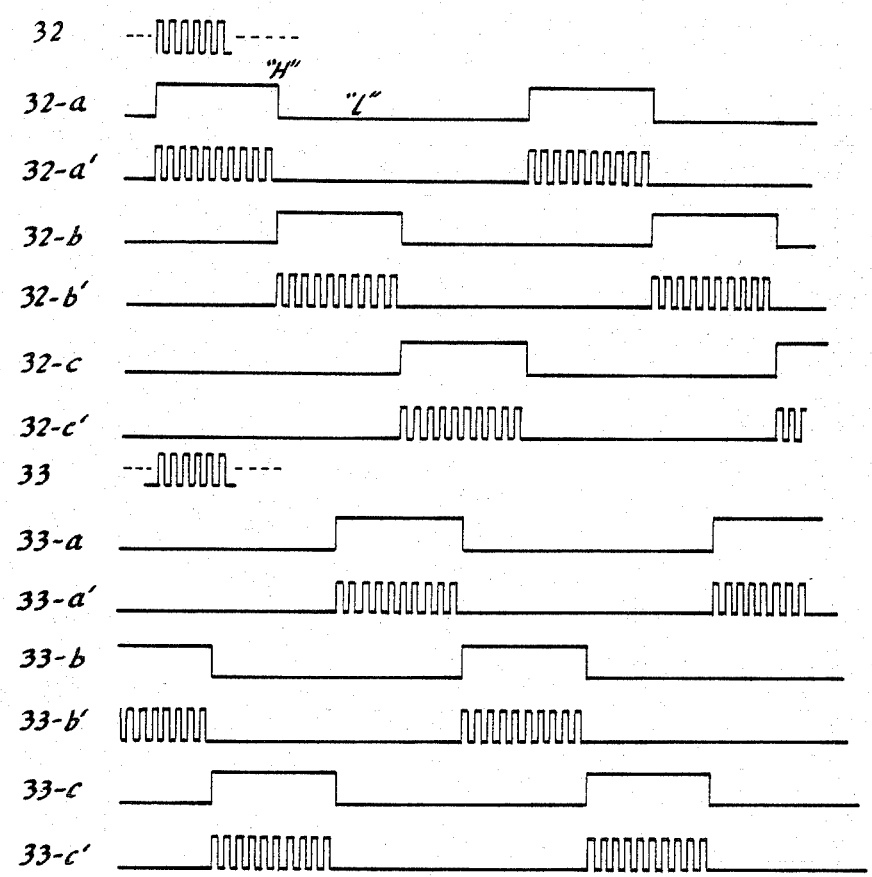
FIG. 16 is a timing chart showing writing and reading clocks for the circuitry of FIG. 15.

Since the reproduce data train applied to the frame memories 30-A, 30-B and 30-C has a frame structure as shown in FIG. 12, the synchronous signal thereof is detected, and the writing timing signals 32-a, 32-b and 32-c of FIG. 16 are produced by using the reproduce clock on the basis of the detected synchronous signal. The three frame memories 30-A, 30-B and 30-C are arranged such that each frame memory stores the reproduce data corresponding to a single frame. Timing signals 33-a, 33-b and 33-c for reading out from the frame memories 30-A, 30-B and 30-C are produced by using the detected synchronous signal and the reference clock 33.

In the case that a plurality of heads of the multi-track head (record head, reproduce head or record/reproduce head) are aligned in line, when signals recorded in the above-described manner are picked up and reproduced, reproduce signals from adjacent tracks have phase difference therebetween, which phase difference equals the phase difference between corresponding pulse train writing or recording currents. Therefore, the writing timing of reproduce data to each frame memory is shifted from another writing timing of reproduce data from an adjacent track. This phase difference equals Tw/2 in the above-described second embodiment. A possible phase difference throughout all the tracks is less than the phase difference between adjacent tracks multiplied by M, namely, a maximum phase difference does not exceed the period of one bit, i.e. T in FIG. 5.

The phase difference between tracks can be absorbed and compensated for by means of the above-described circuit arrangement of FIG. 15. Although the writing clocks 32-a', 32-b' and 32-c' as well as the writing timing signals 32-a, 32-b and 32-c have phase difference between tracks since they are produced from the reproduce clock 32 and the reproduce data, the reading out clocks 33-a', 33-b' and 33-c' as well as reading out timing signals 33-a, 33-b and 33-c have a phase common to all the tracks because they are produced on the basis of the reference clock 33. Thus reading out operation from the three frame memories 30-A, 30-B and 30-C is effected such that data from all the tracks can be outputted with a uniform timing so as to provide a parallel output data of the same timing.

To this end the start timing of the reading out clock has to be spaced apart from the end timing of the writing clock by more than the phase difference $(M-1) \times \tau$, between all the tracks, wherein $\tau$ is the phase difference between adjacent tracks. The number of bits forming a single frame is usually between 200 and 400, and therefore, when the reading out clock common to all the tracks is fed to the frame memories at an instant ½ frame period after the end timing of the writing clock, which is produced from a reproduce signal train picked up from a reference track predetermined as a timing reference, it is possible to derive reproduce data from all the tracks with the same timing without suffering from any problems.

In the above-described embodiments, although the pulse waveforms of the writing currents substantially correspond to the waveform of the modulated signals, the waveform of the pulse train writing currents are controlled so as to suppress undesirable peak shift in the following embodiments.

In a following third embodiment, the period of level inversion, i.e. a time length between two consecutive level inverting portions, in the modulated signal is measured in a writing circuit by using a pulse signal. Then the number of consecutive pulses of the same polarity in the writing current is controlled such that when a level inversion period of 2T is adjacent to a level inversion period T, the number of consecutive pulses of the same polarity is reduced by a number necessary for suppressing peak shift in connection with T, while the number of consecutive pulses of the same polarity is increased in connection with 2T by the same number as the above-mentioned reduced number.

The repetition period of respective pulse signals fed to writing circuits is selected to be equal to Tw divided by an integer, wherein Tw is a data window width on demodulation, and also equal to a time period necessary for suppressing peak shift divided by an integer. In the third embodiment of FIG. 17, the magnetic heads are divided into M groups, and M pulse signals having different phases from another are provided where the repetition period of the pulse signal is set to Tw/3. The width tp of pulse is selected so that M pulse trains do not overlap or coincide. Namely, tp is selected so as to satisfy a condition of $tp \times M \leq Tw/3$.

Figure 18:
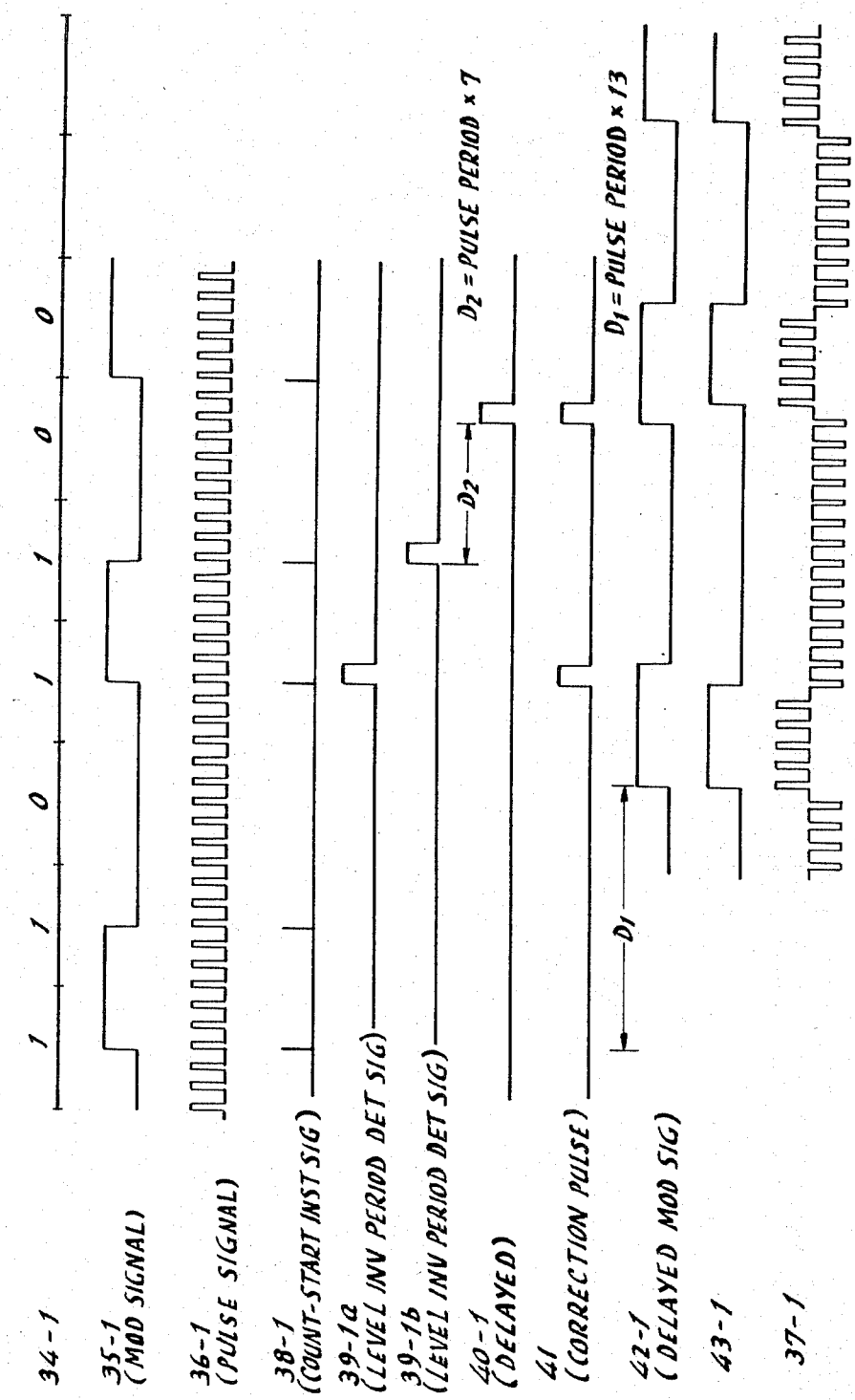
FIG. 18 is a waveform chart showing the operation of the writing circuit used for the third embodiment.
Figure 19:
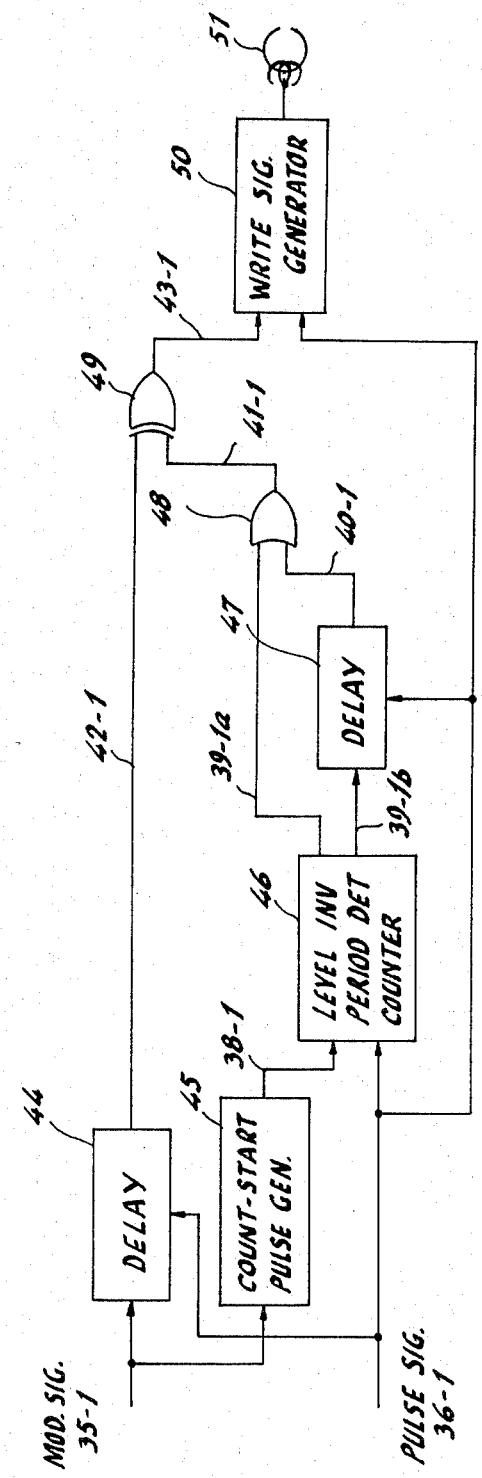
FIG. 19 is a schematic block diagram of the writing circuit used in the third embodiment.

The operation of the writing circuit in the third embodiment will be further described with reference to a waveform chart of FIG. 18 and a block diagram of FIG. 19. This embodiment also uses MFM signals 35-1 which are fed to count-start pulse generating circuit 45 in which an instruction signal 38-1 for counting the number of pulses 36-1 is produced. A level inversion period counting detecting circuit 46 starts counting in response to a count-start pulse 38-1 to output level inversion period detection signals 39-1a and 39-1b. The level inversion period detection signal 39-1a is outputted when the period of the count-start pulse continues as T (pulse signal period multipled by 6) and 2T (pulse signal period multiplied by 12), i.e. when the count of the pulse number is first 6, and is then 12. The other level inversion period detection signal 39-1b is outputted when the period of the count-start pulse continues as 2T and T, i.e. when the count of the pulse number is first 12, and is then 6. The level inversion period detection signal 39-1b is retarded by a delay circuit 47 by an interval corresponding to 7 periods of the pulse signal so as to obtain an output signal 40-1. The pulse 39-1a and its retarded pulse 40-1 are fed to an OR gate 48 to produce a correction pulse 41-1. For timing adjustment between the correction pulse and the modulated signal, the modulated signal 35-1 is retarded by a delay circuit 44 by a time interval D1 equal to the pulse signal period multiplied by 13 so as to produce a retarded modulated signal 42-1. The retarded modulated signal 42-1 and the correction pulse 41-1 are fed to an EX-OR gate 49 to produce a pulse train writing current control signal 43-1. The pulse signal 36-1 and the pulse train writing current control signal 43-1 are used in a writing signal producing circuit 50 to produce a pulse train writing current. The writing signal producing circuit 50 operates such that it amplifies the pulse signal toward a positive direction when the pulse train writing current control signal 43-1 is of high level, and toward a negative direction when the pulse train writing current control signal 43-1 is of low level. Namely, the circuit arrangement of FIG. 8 may be used as the writing signal producing circuit 50. The writing signal producing circuit 50 produces a writing current 37-1 in this way. It is to be noted that this writing current 37-1 has a peak shift suppression effect as shown in FIG. 1 because the position of pulse polarity variation is shifted in a direction of suppressing peak shift.

Figure 17:
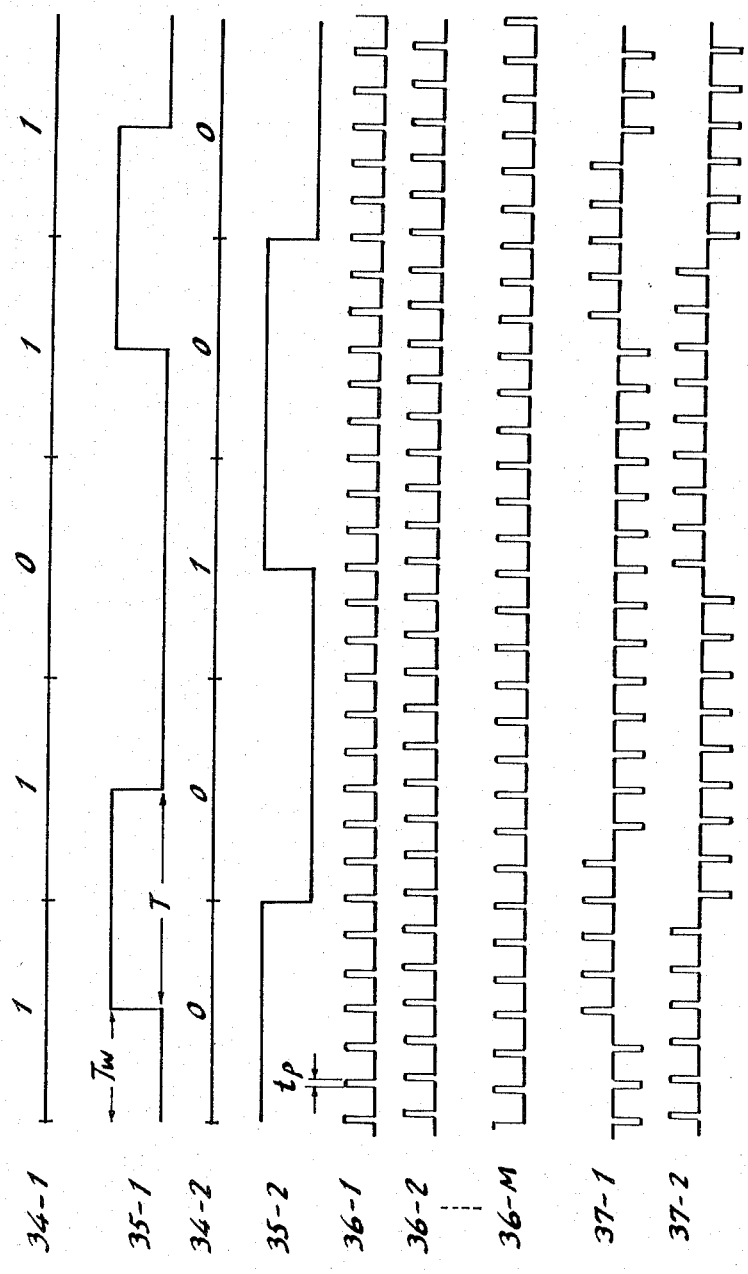
FIG. 17 is a waveform chart showing the operation of a third embodiment.

On a track adjacent to a track on which the modulated signal 35-1 corresponding to data 34-1 is recorded, is recorded another modulated signal 35-2 corresponding to another data 34-2. A magnetic head used for recording the modulated signal 35-2 receives a pulse train writing current 37-2 produced by using a pulse signal 36-2 having a phase different from that for the head used for recording the modulated signal 35-1 since these heads belong to different groups. This pulse train writing current 37-2 is produced in the same manner as in the writing circuit used for the modulated signal 35-1. It is to be noted that the pulse train writing currents 37-1 and 37-2 are prevented from being simultaneously fed to corresponding heads as shown in FIG. 17 due to the phase difference between the two different pulse signals.

According to the above-described structure, the level inversion period or interval of the modulated signal is measured by using the pulse-train-writing-current-producing-pulse signal, and the pulse number of consecutive pulses of the same polarity of the pulse train of the writing current is increased or decreased, namely, the position or timing of level inversion of the writing signal is determined by using the peiod of the pulse signal as unit. Therefore, suppression of peak shift can be effectively attained without causing a plurality of writing currents to flow simultaneously through a plurality of heads of different groups.

According to another or fourth embodiment of the present invention, the level inversion period of the modulated signal is measured by using a pulse signal, and a pulse train writing current is produced such that when the level inversion period of the modulated signal equals 2T, the polarity of pulses positioned at the middle of consecutive pulses of the pulse train writing current for 2T is inverted. This embodiment will be described with reference to FIGS. 20 to 21.

Figure 21:
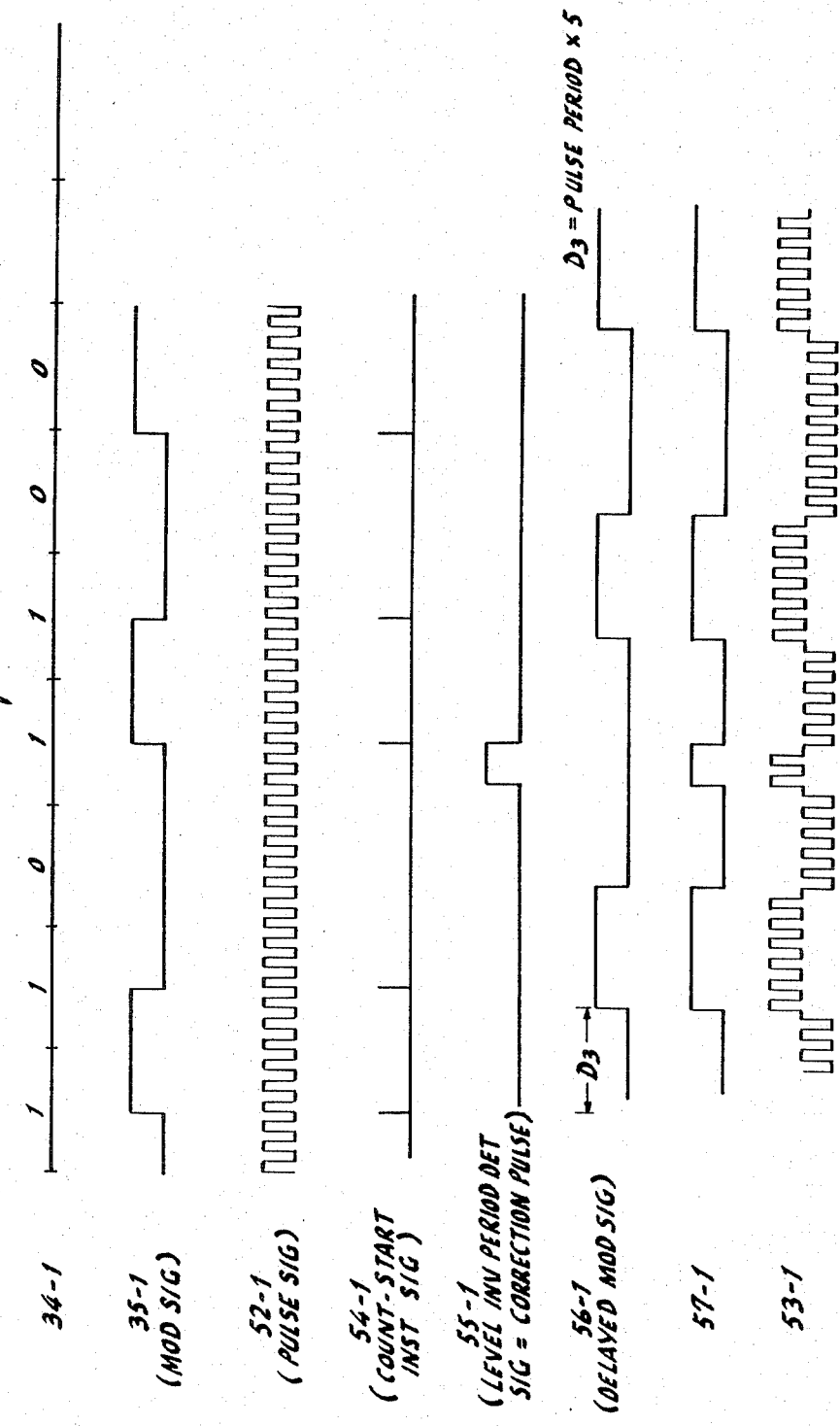
FIG. 21 is a waveform chart showing the operation of the writing circuit used for the fourth embodiment.
Figure 22:
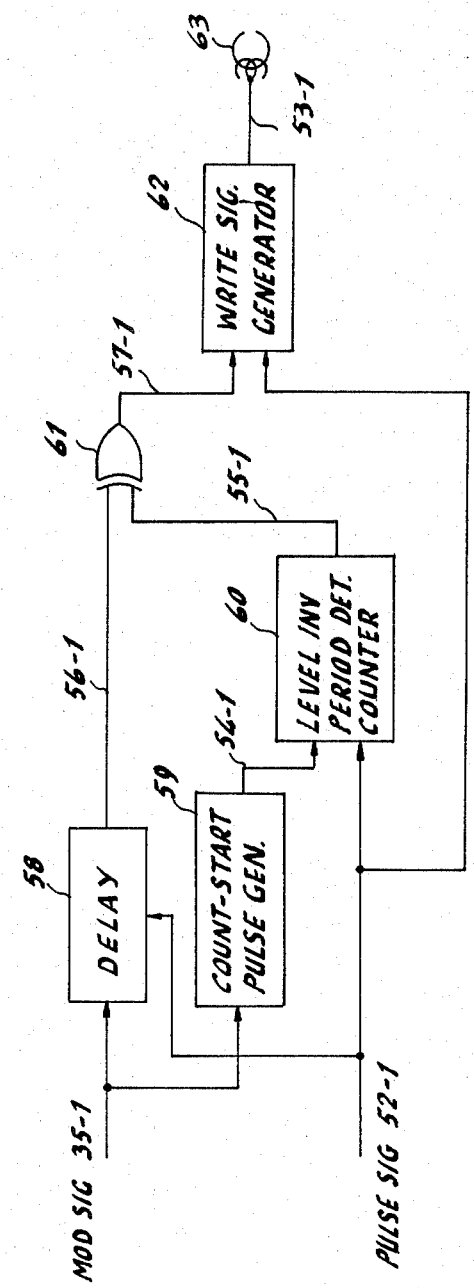
FIG. 22 is a schematic block diagram of the writing circuit used in the fourth embodiment.

This embodiment also uses an MFM signal, and description will be made taking an example of a case in which the magnetic heads are divided into two groups. A pulse signal to be used for producing a pulse train writing current waveform is generated by a pulse generator. The repetition period of the pulse signal is selected to be equal to Tw divided by an integer, wherein Tw is a data window width on demodulation, and also equal to a time period necessary for suppressing peak shift divided by an integer. In the fourth embodiment of FIGS. 20 to 21, the repetition frequency of the pulse signal is set to Tw/3, and the duty cycle is 50 percent. The operation of the writing circuit will be described with reference to FIG. 21, which is a waveform chart, and FIG. 22 which is a block diagram. A modulated signal 35-1 is fed to a count-start pulse generating circuit 59 so as to produce an instruction signal 54-1 for counting a pulse signal 52-1. A level inversion period counting and detecting circuit 60 starts measuring in response to the count-start pulse 54-1, and outputs a level inversion detection signal 55-1 when the count reaches 11, namely when $(Tw/3) \times 11 = (11/6)T$ (because $Tw = T/2$). In the case of an MFM signal, the level inversion period assumes one of T, 1.5T and 2T, and the number pulses included in these periods are respectively 6, 9 and 12. Therefore, the count 11 indicates that the pulse inversion period is 2T. The above-mentioned level inversion detection signal 55-1 is used as a correction pulse for inverting the polarity of pulses positioned at the middle of the pulse train writing current for the level inversion period 2T. To this end the modulated signal 35-1 is retarded by an interval equal to five times the pulse period by means of a modulated signal delay circuit 58 to produce a delayed modulated signal 56-1. The delayed modulated signal 56-1 and the level inversion period detection pulse (correction pulse) 55-1 are both fed to an EX-OR gate 61 to produce a pulse train writing current control signal 57-1. The pulse train writing current control signal 57-1 and the pulse signal 52-1 are both fed to a writing signal producing circuit 62 to produce a writing current. In this writing signal producing circuit 62, the pulse signal is amplified in a positive direction when the pulse train writing current control signal 57-1 is of high level, and in a negative direction when the pulse train writing current control signal 57-1 is of low level. Namely, the circuit arrangement of FIG. 8 may be used. As the result of the above operation, a pulse train writing current 53-1 is obtained to be fed to a corresponding magnetic head 63. According to the fourth embodiment, since the polarity of small number of pulses, i.e. two pulses in this embodiment, at the middle of a long level inversion period portion is inverted, the peak shift suppressing effect of FIG. 2 is resulted.

Figure 20:
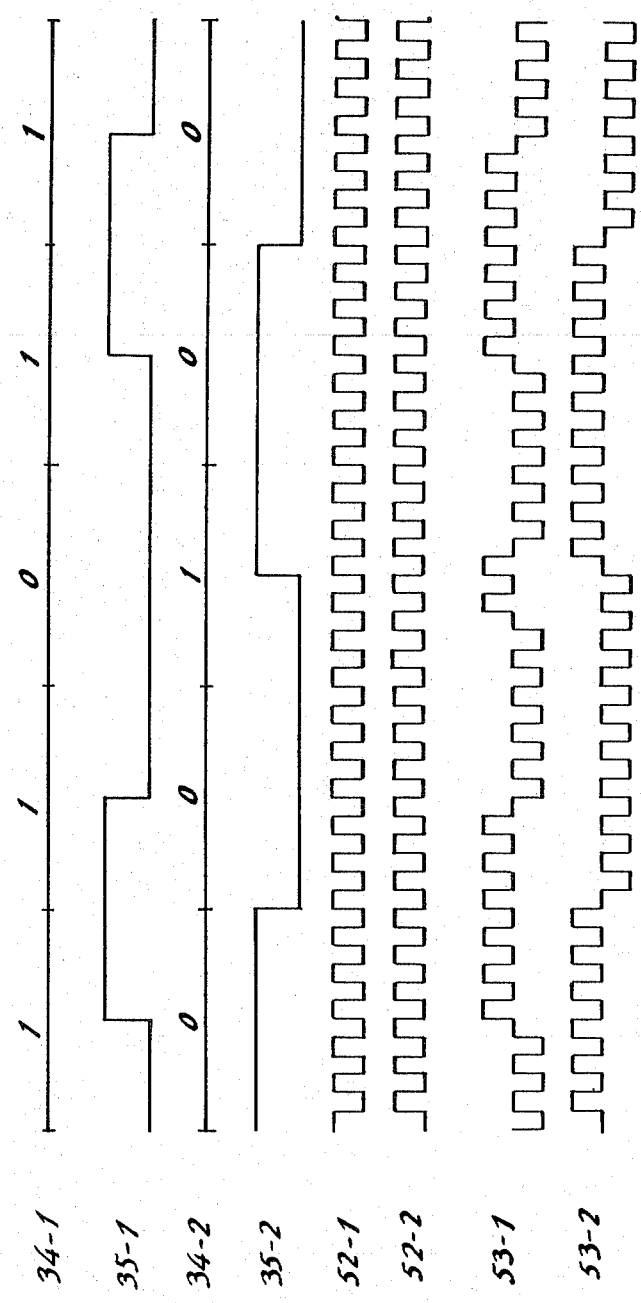
FIG. 20 is a waveform chart showing the operation of a fourth embodiment.

On a track adjacent to a track on which the modulated signal 35-1 corresponding to data 34-1 is recorded, is recorded another modulated signal 35-2 corresponding to another data 34-2. A magnetic head used for recording the modulated signal 35-2 receives a pulse train writing current 53-2 produced by using a pulse signal 52-2 whose phase is shifted from that of the track used for recording the modulated signal 35-1 by 180 degrees since the group of the head is different. This pulse train writing current 53-2 is produced in the same manner as in the writing circuit used for the modulated signal 35-1. It is to be noted that the pulse train writing currents 53-1 and 53-2 are prevented from being simultaneously fed to corresponding heads as shown in FIG. 20 due to the phase difference of the pulse signal.

According to the above-described structure, the level inversion period or interval of the modulated signal is measured by using the pulse-train-writing-current-producing-pulse signal, and the polarity of small number of pulses positioned at the middle of the pulse train of the writing current is inverted so as to suppress peak shift. Therefore, suppression of peak shift can be effectively attained as shown in FIG. 20 without causing a plurality of writing currents to flow simultaneously through a plurality of heads of different groups. Although the above fourth embodiment has been described in connection with a case that the entire heads are divided into two groups, similar result will be obtained if the heads are divided into three or more groups.

Figure 23:
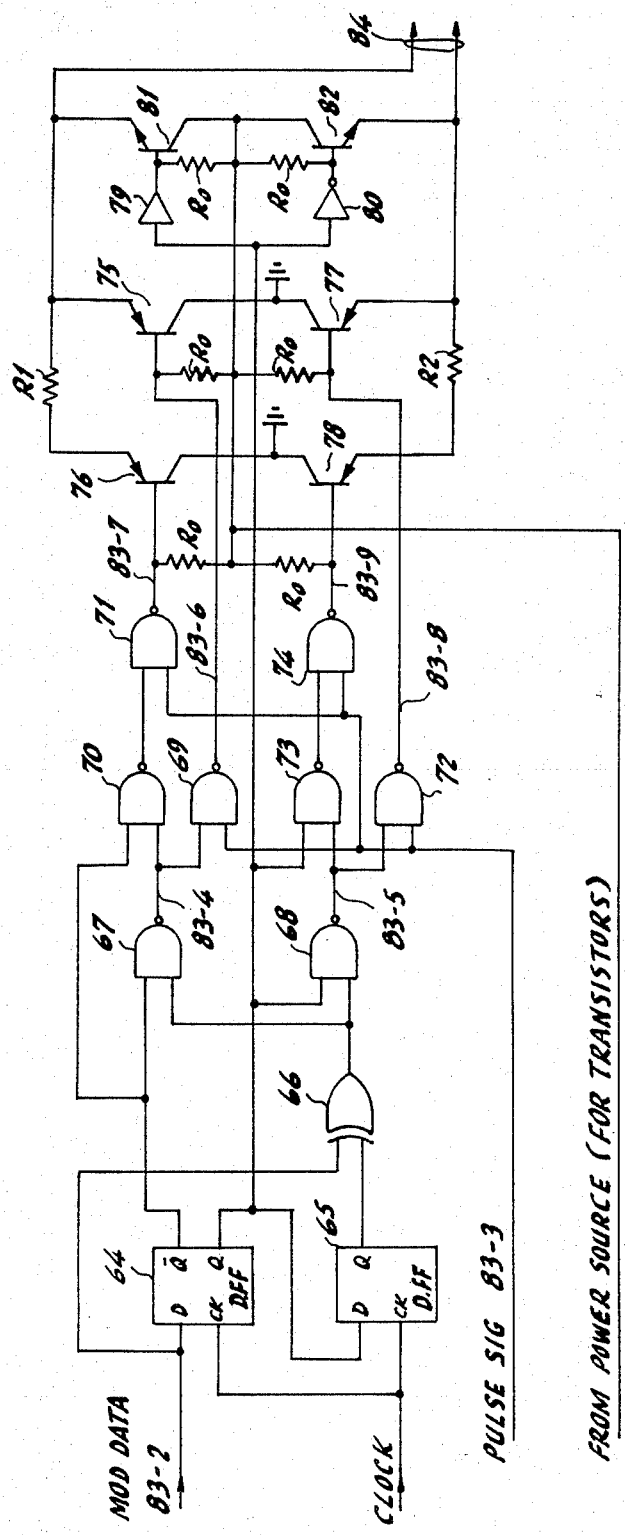
FIG. 23 is a schematic block diagram of a writing circuit used in a fifth embodiment.

FIG. 23 shows another or fifth embodiment of the present invention in which the peak value of the pulse train writing current is varied at a position close to a point of level inversion of the modulated signal so as to suppress peak shift. The operation of the circuit arrangement of FIG. 23 will be described with reference to a waveform chart of FIG. 24. The references 64 and 65 are flip-flops; 66, an EX-OR gate; 67 through 74, NAND-gates; 75 through 78, switching transistors; 79, a non-inverter; 80, an inverter; and 81 and 82, writing current driving transistors. Since an MFM signal is used in this embodiment, a modulated signal corresponding to data 83-1 of FIG. 24 is such that shown by the waveform 83-2. As described in connection with FIGS. 6 and 7, it is assumed that a pulse signal having a waveform 83-3 is inputted to the writing circuit. At first the modulated signal 83-2 is inputted to the flip-flop 64 in synchronism with clock, and the output signal thereof is inputted to another flip-flop 65, and the EX-OR gate 66 is responsive to the output signal from the flip-flop 65 and to the modulated signal 83-2 for detecting the position of level inversion of the modulated signal 83-2. The output signal from the EX-OR gate 66 is inputted to NAND gates 67 and 68 to obtain output signals 83-4 and 83-5 which indicate the position where the peak value of the writing current is to be varied. The output signal from the NAND gate 67 is inputted to the NAND gates 69 and 70, while the output signal from the NAND gate 70 is inputted to the NAND gate 71. To the other input of each of the NAND gates 69 and 72 is inputted the pulse signal 83-3 so as to obtain an output signal 83-6 from the NAND gate 69 and another output signal 83-7 from the other NAND gate 71. Similarly, output signals 83-8 and 83-9 are obtained from the NAND gates 72 and 74. The output signals from the NAND gates 69 and 71 are respectively fed to base electrodes of the transistors 75 and 76 to render them conductive when the base voltage is of low level. Similarly, the output signals from the NAND gates 72 and 74 are fed to base electrodes of the transistors 77 and 78. The transistors 75, 76, 77 and 78 function as switches for resistors R1 and R2, which vary the peak value of the pulse by limiting the writing current. For instance, in the case of the waveform 83-6, the transistor 75 is conductive when the base voltage 83-6 is of low level and the transistor 76 is nonconductive due to high level of the waveform 83-7, and therefore no current flows via the resistor R1. As a result, the peak value is resulted as shown by the waveform 84 (see a peak value $I_1$) When current flows via the resistor R1, the amount of the writing current lowers as shown by the peak value $I_2$ for an interval that current flows via the resistor R1. Therefore, it is possible to control the peak value of the writing current by the switching function of the transistors 75 to 78. The output signal from the flip-flop 64 is inputted to the non-inverter 79 and to the inverter 80, and therefore, the transistors 81 and 82 are rendered conductive to obtain a writing current for a period of time that the output signal is of high level. The circuit arrangement of FIG. 23 operates in the above-described manner so as to obtain the writing current 84 having different peak values.

In the illustrated embodiment, since the transistors 76 to 82 are powered from a power source which is separately provided from a power source used for logic gates, the first or higher peak value, i.e. $I_1$ in the waveform 84, can be changed depending on the output voltage of the power source. Furthermore, the second or lower peak value, i.e. $I_2$, can be changed by changing the values of the resistors R1 and R2. Although the only one pulse having the first or higher peak value $I_1$ is provided before and after the point of level inversion in the illustrated embodiment, the number of pulses having the higher peak value $I_1$ may be increased. Moreover, the peak value may be suitably selected in accordance with the characteristic of the record heads or recording medium.

Although the above embodiments of the present invention have been described in connection with an MFM signal, modulated signals of other types, such as NRZi, FM, 3PM or the like, may also be used. In other words, the present invention is not limited to a particular way of modulation. When the present invention is applied to various modulation systems, it is necessary that the period of the pulse signal equals Tw divided by an integer wherein Tw is the window width for detecting data on demodulation.

The above-described embodiments are just examples of the present invention, and therefore, it will be apparent for those skilled in the art that many modifications and variations may be made without departing from the spirit of the present invention.

What is claimed is:

1. A circuit arrangement for use with a magnetic recording apparatus for writing digital data on a plurality of tracks on a magnetic recording medium by means of a multi-track head, comprising:
   (a) a plurality of modulators each responsive to a signal to be recorded on a single track for producing a modulated signal;
   (b) a pulse generator for producing M pulse trains having different phases from another so that pulses of said M pulse trains do not coincide, wherein M is a positive integer other than one; and
   (c) a plurality of writing circuits each responsive to each of said modulated signals from said modulators and to each of said pulse trains from said pulse generator, said writing circuits producing respectively writing currents fed to heads of said multi-track head, said writing currents being fed to the heads such that writing currents having the same phase are fed to a plurality of said heads belonging to the same group where said heads of said multi-track head are electrically divided into M groups, said heads of the same group being positioned so that they are not adjacent to each other.

2. A circuit arrangement for use with a magnetic recording apparatus as claimed in claim 1, further comprising means for controlling the number of consecutive pulses of the same polarity in each of said writing currents.

3. A circuit arrangement for use with a magnetic recording apparatus as claimed in claim 2, wherein said means comprises a counting means for counting the number of clock pulses for measuring the period of level inversion of said modulated signal.

4. A circuit arrangement for use with a magnetic recording apparatus as claimed in claim 3, wherein said means comprises a means for increasing the number of consecutive pulses of the same polarity corresponding to a long level inversion period in said modulated signal when the long level inversion period is followed by a short level inversion period or vice versa, and for decreasing the number of consecutive pulses of the same polarity corresponding to the short level inversion period.

5. A circuit arrangement for use with a magnetic recording apparatus as claimed in claim 3, wherein said means comprises a means for inverting the polarity of small number of pulses positioned at the middle of a pulse train of said writing current corresponding to a long inversion period of said modulated signal, so as to decrease the number of pulses of the same polarity.

6. A circuit arrangement for use with a magnetic recording apparatus as claimed in claim 1, further comprising means for controlling the peak value of some of pulses of said writing current.

7. A circuit arrangement for use with a magnetic recording apparatus as claimed in claim 6, wherein said means is arranged to set a first peak value for at least one pulse which appears before and/or after the point of level inversion of said modulated signal, and a second peak value, which is smaller than said first peak value, for remaining pulses.

8. A method of magnetically recording digital data on a magnetic recording medium by means of a multi-track head, comprising the steps of:
 (a) modulating said digital data to provide a plurality of modulated signals;
 (b) producing M pulse trains having different phases from another so that pulses of said M pulse trains do no coincide, wherein M is a positive integer other than one; and
 (c) producing a plurality of writing currents for driving a plurality of heads of said multi-track head to write said modulated signals on said recording medium by forming a plurality of tracks thereon, each of said writing currents being produced by using each of said modulated signals and each of said pulse trains, said writing currents being fed to said heads such that writing currents having the same phase are fed to a plurality of said heads belonging to the same group where said heads of said multi-track head are electrically divided into M groups, said heads of the same group being positioned so that they are not adjacent to each other.

9. A method of magnetically recording as claimed in claim 8, further comprising the step of controlling the number of consecutive pulses of the same polarity in each of said writing currents.

10. A method of magnetically recording as claimed in claim 9, wherein the controlling step comprises a step of counting the number of clock pulses for measuring the period of level inversion of said modulated signal.

11. A method of magnetically recording as claimed in claim 9, wherein the controlling step comprisies a step of increasing the number of consecutive pulses of the same polarity corresponding to a long level inversion period in said modulated signal when the long level inversion period is followed by a short level inversion period or vice versa, and for decreasing the number of consecutive pulses of the same polarity corresponding to the short level inversion period.

12. A method of magnetically recording as claimed in claim 9, wherein the controlling step comprisies a step of inverting the polarity of small number of pulses positioned at the middle of a pulse train of said writing current corresponding to a long inversion period of said modulated signal, so as to decrease the number of pulses of the same polarity.

13. A method of magnetically recording as claimed in claim 8, further comprising the step of controlling the peak value of some of pulses of said writing current.

14. A method of magnetically recording as claimed in claim 13, wherein the controlling step comprises a step of setting a first peak value for at least one pulse which appears before and/or after the point of level inversion of said modulated signal, and a second peaks value, which is smaller than said first peak value, for remaining pulses.

* * * * *